Oct. 12, 1954  H. D. VAN SCIVER II  2,691,330
ANTISLIP PLATE AND METHOD OF MAKING THE SAME
Filed July 19, 1950

INVENTOR.
Herbert D. Van Sciver II.
BY
ATTORNEY

Patented Oct. 12, 1954

2,691,330

UNITED STATES PATENT OFFICE 2,691,330

ANTISLIP PLATE AND METHOD OF MAKING THE SAME

Herbert D. Van Sciver II, Merion, Pa., assignor to The Budd Company, Philadelphia, Pa., a corporation of Pennsylvania Application July 19, 1950, Serial No. 174,703

4 Claims. (Cl. 94—5)

This invention relates to anti-slip plates and method of making the same and has for an object the provision of improvements in this art.

One of the particular objects of the invention is to provide an anti-slip plate which will have a long life and which will retain its anti-slip properties unimpaired and even improved with wear.

Another object is to provide an anti-slip plate which has good initial anti-slip properties.

Another object is to provide an anti-slip plate having integral hard and soft areas which have no tendency to separate or come apart even in the final stages of wear when the plate is substantially worn through.

Another object is to provide an improved method of forming an anti-slip plate, the method including a hardened action at spaced places over the area of the plate and in one embodiment being in the nature of a heat-treating operation such, for example, as a resistance welding operation performed on a plate having a heat-hardenable composition.

The above and other objects and various novel features of the invention will be apparent from the following description of an illustrative embodiment, reference being made to the accompanying drawings, wherein.

Figure 1:
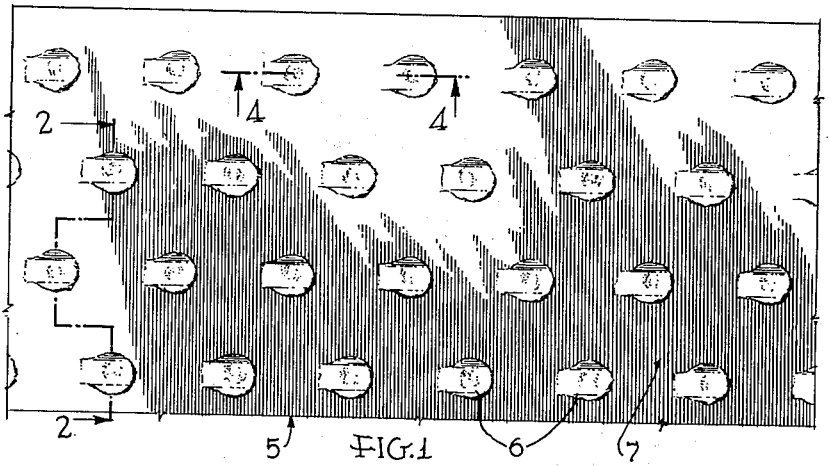
Fig. 1 is a plan view of a plate embodying the invention.
Figure 2:
Fig. 2 is a cross-section taken on the line 2—2 of Fig. 1.

The article comprises a plate 5 having such inherent composition throughout its full thickness from both external surfaces that it is subject by proper treatment to local hardening at spaced places or spots indicated by the numeral 6. The areas of less hard metal between hard spots are indicated by the numeral 7. These areas 7 are the original unhardened metal. The hardened spots or zones 6 extend entirely through the full thickness of the plate from surface to surface.

Figure 4:
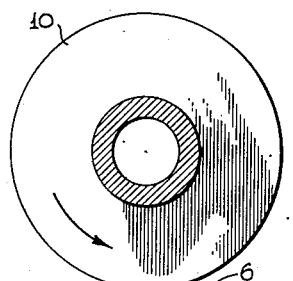
Fig. 4 shows one form of apparatus for producing the plates, the plate section being taken on line 4—4 of Fig. 1.

In one form of the invention a steel plate 5 having a medium high carbon content is locally heated at spaced spots 6 in the manner shown in Fig. 4 by pressing opposed resistance heating welding roller electrodes 10 against opposite sides of the plate and causing electric current to flow through at spots or lines until the metal quickly reaches the critical temperature and before heat can travel to adjacent metal. The electrodes move away very rapidly and the heated zone is cooled rapidly in known manner to harden the metal. It may be quenched if desirable. Largely, heat is lost to adjacent cooler metal, and to some extent heat is lost from the surfaces to the air. The electrodes move away fast enough to prevent their fusing and sticking to the surfaces and to avoid keeping the metal at the surfaces so cool that it will not reach the hardening temperature. The desired composition of metals for heat hardening, the necessary temperatures to reach the critical point at which the metal hardens, and the required heating and cooling procedures are all well known in the art and require no explanation here, the information being available in many handbooks and textbooks.

Figure 5:
Fig. 5 shows the apparatus of Fig. 4 from another direction.
Figure 5:
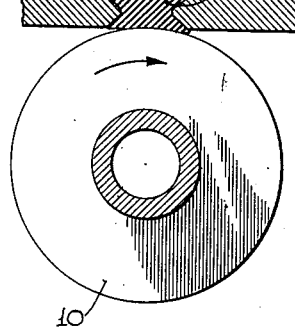
Figure 5:
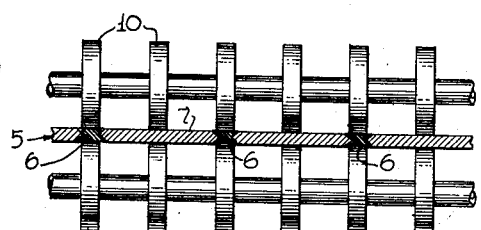

In Figs. 4 and 5 the heating operation is shown as being performed by a gang of welding rolls 10 which travel along spaced lines on the plate and by the suitable application of electric current heat and cause hardening either of continuous lines or of spaced spots along their path.

The metal may be partially fused at the center of the nugget or slug which is heated but preferably the heating will be such that the metal is merely raised above the critical point at which it will harden. It is softened and this permits the rolls to form the roughened surface shown. As is known, the rapidity of cooling, of carbon steel at least, determines the degree of hardening but it has been found that the dissipation of heat to the adjacent metal and air will produce very hard spots which will wear many times as long as the adjacent unhardened metal.

It will be evident that welding rolls, used in known manner, to send shots of current through the plate at intervals will heat spaced zones or nuggets through the entire thickness of the plate to the critical temperature at which they will harden. This action will not cool the nuggets at the plate surfaces to keep them below the critical temperature as would be the case if gun-type cooled electrodes were used nor overheat the electrodes in order to attain the desired surface heat, as would be the case if gun-type electrodes were used without being cooled. The rolls heat the metal sufficiently and then move away before soft spots can form on them, and, moreover, the heat from the contact points of the rolls with the plate spreads out to the body of the electrodes, the action being very rapid since electrodes are normally made of highly conductive metals like copper and high-copper alloys. Since the nuggets are heated adequately for the full thickness of the plate and since the surrounding plate body portions and air extract heat rapidly from the nuggets, they will be hardened throughout their extent when a suitable hardenable material is used. A weld line will be similar to spaced nuggets and may be considered as a series of nuggets so closely spaced in the line as to overlap each other.

Figure 3:
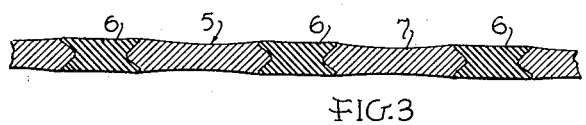
Fig. 3 is a section like that of Fig. 2 showing the plate after wear.

By the selection of suitable electrodes and the use of suitable current and pressure the surface is initially left in a roughened condition at the hardened zones with portions standing above the surface of the plate as best shown in Figs. 1 and 4. In fact, the very type of electrode which gives a rough and unsatisfactory surface for normal welding is the one best suited for the present purposes. If the initially-formed spots have points or edges which are undesirably sharp they may be smoothed by grinding or sand blasting; and if it is desired to cause the spots to stand out in greater relief before the plate is used, it may be sandblasted to cut down the softer metal on all sides of the hard slugs, nuggets, or bodies. In Fig. 3 the plate is shown as having been worn by surface traffic on one side and then turned over and worn on the other side.

It is relatively easy and inexpensive to form these anti-slip plates. No welding on or fusing on of metal to the surface is required, and the plates do not rapidly wear smooth again as do plates on which metal has been fused upon the surface. Nor is it necessary to drill holes in the plates and insert hard plugs, as has been one practice heretofore. Such plugs, besides being expensive to prepare and secure, are likely to fall out during use. The slugs formed by the present process, being integral with the surrounding metal, can never get loose or come out.

The hardened zones may be in spaced spots or lines arranged in various ways, and of various dimensions. It is impossible now to give dimensions which will prove most suitable for various purposes but one plate which has been made for a floor subject to shoe and tire wear has a spacing in rows and between rows of about 1⅛" and nugget diameters of ¼" to ½" at the surface. The carbon content of the steel may range from about 0.40% to about 0.60%, a steel of about 0.50% carbon having given excellent results. The presence of other ingredients will affect the carbon content needed for hardening. Such metallurgy is well known and is mentioned here only by way of example.

It is thus seen that the invention provides an improved anti-slip plate and an improved method of making it, and while one embodiment has been described and illustrated in detail by way of example, it is to be understood that there may be various embodiments within the general scope of the invention.

What is claimed is:

1. An anti-slip uneven wearing plate comprising spaced integral nuggets or slugs of hardened metal extending through the full thickness of the plate and surrounding less hard parent metal, the nuggets being of approximately uniform hardness throughout the full thickness of the plate from surface to surface and of the same chemical composition as the parent surrounding metal, the hardened nuggets having roughened ends with portions which sand above the surface of the sheet.

2. An anti-slip uneven wearing plate comprising a body of hardenable carbon steel having spaced integral zones of heat-transformed hardened metal extending through the full thickness of the sheet, the metal in the spaced zones being of approximately uniform hardness throughout the full thickness of the plate from surface to surface and of the same chemical composition as the surrounding integal less hard parent metal, the spaced hardened zones having roughened ends with portions which stand above the surface of the sheet.

3. The method of making an anti-slip uneven wearing plate or the like from a plate of heat-transformable hardenable carbon steel of approximately uniform chemical composition throughout its thickness, which comprises, successively heating spaced zones on the plate between roller resistance electrodes of such size and carrying current of suitable characteristics to raise the zones to the transformation temperature throughout the thickness of the plate while leaving the adjacent parent metal cooler and below the transformation temperature, and rapidly removing the electrodes from contact with a heated zone to cause it to lose heat rapidly to the adjacent parent metal and harden to approximately uniform hardness throughout the full depth of the heated zone, the current flow being so proportioned as to soften the metal in the zones and the pressure maintained on the electrodes being such as to squeeze the softened zones to roughen their end surfaces and raise portions thereof above the surface of the plate.

4. The method of making an anti-slip uneven wearing plate or the like from a plate of heat-transformable hardenable metal of approximately uniform chemical composition throughout its thickness, which comprises, successively heating spaced zones on the plate between roller resistance electrodes of such size and carrying current of suitable characteristics to raise the zones to the transformation temperature throughout the thickness of the plate while leaving the adjacent parent metal cool and below the transformation temperature, and rapidly removing the electrodes from contact with a heated zone to cause it to lose heat rapidly to the adjacent parent metal and harden to approximately uniform hardness throughout the full depth of the heated zone, the current flow being so proportioned as to soften the metal in the zones and the pressure maintained in the electrodes being such as to squeeze the softened zones to roughen their end surfaces and raise portions thereof above the surface of the plate.

References Cited in the file of this patent

UNITED STATES PATENTS

| Number | Name | Date |
|---|---|---|
| 694,618 | Cosgrave | Mar. 4, 1902 |
| 1,147,783 | Carter | July 27, 1915 |
| 1,657,446 | Nagin et al. | Jan. 24, 1928 |
| 1,767,653 | Davis | June 24, 1930 |
| 1,866,538 | Andrus | July 12, 1932 |
| 2,073,758 | Schmeller | Mar. 16, 1937 |
| 2,086,801 | Hayden | July 13, 1937 |
| 2,145,864 | Denneen et al. | Feb. 7, 1939 |
| 2,325,079 | Soderholm | July 27, 1943 |
| 2,326,674 | Pavitt | Aug. 10, 1943 |

FOREIGN PATENTS

| Number | Country | Date |
|---|---|---|
| 462,374 | Great Britain | May 30, 1935 |
| 580,976 | Great Britain | Sept. 26, 1946 |